United States Patent
Voodem

(10) Patent No.: US 12,531,932 B2
(45) Date of Patent: Jan. 20, 2026

(54) PREVENTING, IDENTIFYING, AND RESOLVING CONFLICTING SESSION INFORMATION

(71) Applicant: T-MOBILE INNOVATIONS LLC, Overland Park, KS (US)

(72) Inventor: Suryaprakash Reddy Voodem, Bothell, WA (US)

(73) Assignee: T-MOBILE INNOVATIONS, Overland Park, KS (US)

( * ) Notice: Subject to any disclaimer, the term of this patent is extended or adjusted under 35 U.S.C. 154(b) by 3 days.

(21) Appl. No.: 18/541,734

(22) Filed: Dec. 15, 2023

(65) Prior Publication Data

US 2025/0202987 A1    Jun. 19, 2025

(51) Int. Cl.
*H04L 67/146*     (2022.01)
*H04L 61/4535*    (2022.01)
*H04L 101/659*    (2022.01)

(52) U.S. Cl.
CPC ........ *H04L 67/146* (2013.01); *H04L 61/4535* (2022.05); *H04L 2101/659* (2022.05)

(58) Field of Classification Search
CPC ............... H04L 67/146; H04L 61/4535; H04L 2101/659; H04L 12/2821
USPC ........................................................ 709/203
See application file for complete search history.

(56) References Cited

U.S. PATENT DOCUMENTS

| | | | |
|---|---|---|---|
| 11,638,134 | B2 | 4/2023 | Krishan et al. |
| 2017/0118218 | A1* | 4/2017 | Koottayi ............... H04L 63/102 |
| 2021/0037047 | A1* | 2/2021 | O'Hara ............... H04L 63/1458 |
| 2022/0201085 | A1 | 6/2022 | Hu |
| 2023/0275830 | A1* | 8/2023 | Chen .................... H04L 61/2514 |
| 2023/0300200 | A1* | 9/2023 | Krishan ................ H04W 76/18 |
| | | | 370/328 |
| 2023/0362615 | A1* | 11/2023 | Yan ........................ H04W 76/14 |

FOREIGN PATENT DOCUMENTS

WO     2022/021971 A1    2/2022

* cited by examiner

*Primary Examiner* — Meng Vang
(74) *Attorney, Agent, or Firm* — Shook, Hardy & Bacon L.L.P.

(57) ABSTRACT

Embodiments of the present disclosure are directed to systems and methods for improved identification and resolution of conflicting session information, such as when multiple session information entries are associated with a single session identifier. By communicating timestamps with the session information deposited in the NF component, the NF component may determine which session information is relevant to the request or which session information is stale and should be removed from its dataset.

20 Claims, 5 Drawing Sheets

PREVENTING, IDENTIFYING, AND RESOLVING CONFLICTING SESSION INFORMATION

SUMMARY

The present disclosure is directed, in part to preventing, identifying, and resolving conflicting session information, substantially as shown and/or described in connection with at least one of the figures, and as set forth more completely in the claims.

According to various aspects of the technology, network function (NF) components of the 5G core network work cooperatively to create and manage sessions. Under typical conditions, NF components are notified when a session is created and a session is terminated. When a session is created, an NF component may store the session information communicated from other NF components, and when a session is terminated, the NF component may remove the session information to avoid retaining conflicting session information. However, in some cases, the termination of a session may not be communicated to NF components, resulting in NF components retaining stale session information and causing bad requests. Conventionally, conflicting session information is removed through auditing that removes all stored data at set intervals of time. The auditing does not prevent, identify, or resolve conflicting session information. By preventing, identifying, and resolving conflicting session information before the audit occurs, fewer bad requests will occur.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
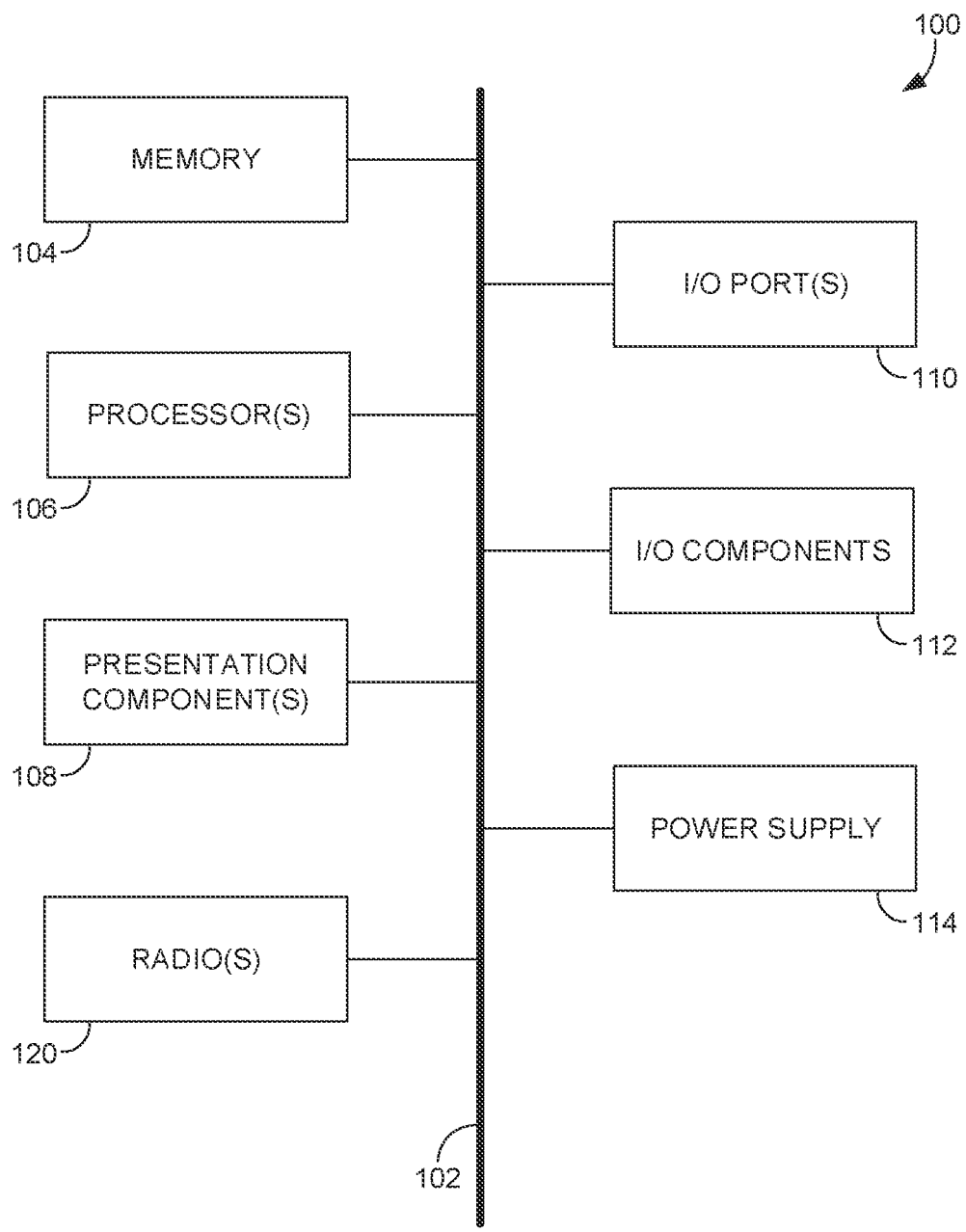
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the 5G core network is comprised of a plurality of network function (NF) components, some of which work cooperatively to create and manage sessions of the network. NF components that work cooperatively to create and manage sessions include, but are not limited to, components such as the Session Management Function (SMF), the Policy Control Function (PCF), and the Binding Support Function (BSF). The SMF communicates with NF components to establish sessions when a UE connects to the network, such as assigning a session identifier like an IPv6 address and a device identifier like a subscription permanent identifier (SUPI). The SMF releases sessions when the UE disconnects from the network, including releasing the session identifier for reassignment to another UE in a subsequent connection. Under typical circumstances, the SMF relays session creation and release information to the one or more PCFs and the one or more PCFs, in turn, communicates session information to the BSF for the BSF to store in a dataset. Because the BSF should add and remove session information when sessions are created and terminated, a request from an NF consumer for session-specific information should yield accurate information. For example, NF consumers, such as a Network Exposure Function (NEF), Application Function (AF), or Network Repository Function (NRF) request session information to complete service requests, authentication, or other functions. However, abrupt disconnection or other network issues can cause the network functions to fail to communicate when a particular UE has deregistered and a session has ended, resulting in NF components, such as the BSF, retaining stale session information in its dataset. For example, the BSF may retain session information associated with a first UE that has powered off or otherwise deregistered from the network such that the session ends. Further, a second UE and a second session may be assigned the same session identifier, such as an IP6 address, from the first UE and first session, resulting in two session information entries with the same session identifier. As a result, when an NF consumer requests information from an NF producer regarding this same identifier, the NF producer is unable to process the request due to conflicting session information. In sum, NF components communicate when a session has ended to prevent conflicts between sessions under typical circumstances. However, this communication may not occur or may not be received due to network issues or where a UE abruptly or ungracefully disconnects from the network and results in stale session information entries and bad requests.

Conventionally, stale session information within networks is removed through a self-auditing process. For example, an NF component may be set up to audit and delete all of its stored session information every 30 days, every 14 days, etc. Timing of the audit is based on an internal timer of an NF component that calculates the amount of time since the last audit was conducted. For example, if an NF component, such as the BSF, is configured to perform an audit every 30 days, information created since the last audit is removed from the system once this internal timer reaches 30 days as calculated from the last audit. The audit process experiences significant challenges, as it does not prevent, identify, or resolve conflicts between session information before the audit occurs. For example, a first UE is assigned an IPv6 address, but later powers off, and the NF component is not communicated this change due to network issues. During a subsequent connection, a second UE is assigned the same IPv6 address as the first. When an NF consumer requests information about the session associated with the IPv6 address, the NF producer is unable to determine which session and which UE the NF requestor is requesting information about and cannot complete the request. The audit process would require many days or weeks to pass before this conflict could be resolved.

In contrast to conventional solutions and to facilitate a more optimized use of the 5G core network, the present disclosure is directed to both proactive and reactive systems and methods of preventing, identifying, and removing conflicting session information from NF components of the 5G core network. Under the proactive framework, an NF component, such as the SMF, PCF, or BSF, can identify a trigger, such as a conflicting session entry where multiple unique UE identifiers are associated with the same session identifier. Upon this determination, the NF component can initiate a targeted self-audit and remove earlier conflicting entries as compared to later conflicting entries, based on a session creation timestamp. Other events may serve as triggers for the proactive solution, such as a threshold length of time exceeding creation of the first timestamp. This ensures that stale session information is removed before a bad request occurs. Under the reactive framework, an NF producer, such as the SMF, PCF, or BSF, in response to a request by an NF consumer, such as the NEF, NRF, or AF, identifies conflicting session entries. Upon this determination, the NF producer can use the session creation timestamp to choose the most recent entry to fulfill the request to the NF consumer. Providing both proactive and reactive solutions allows for both front-end and back-end control of the network.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment (UE), wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g. a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
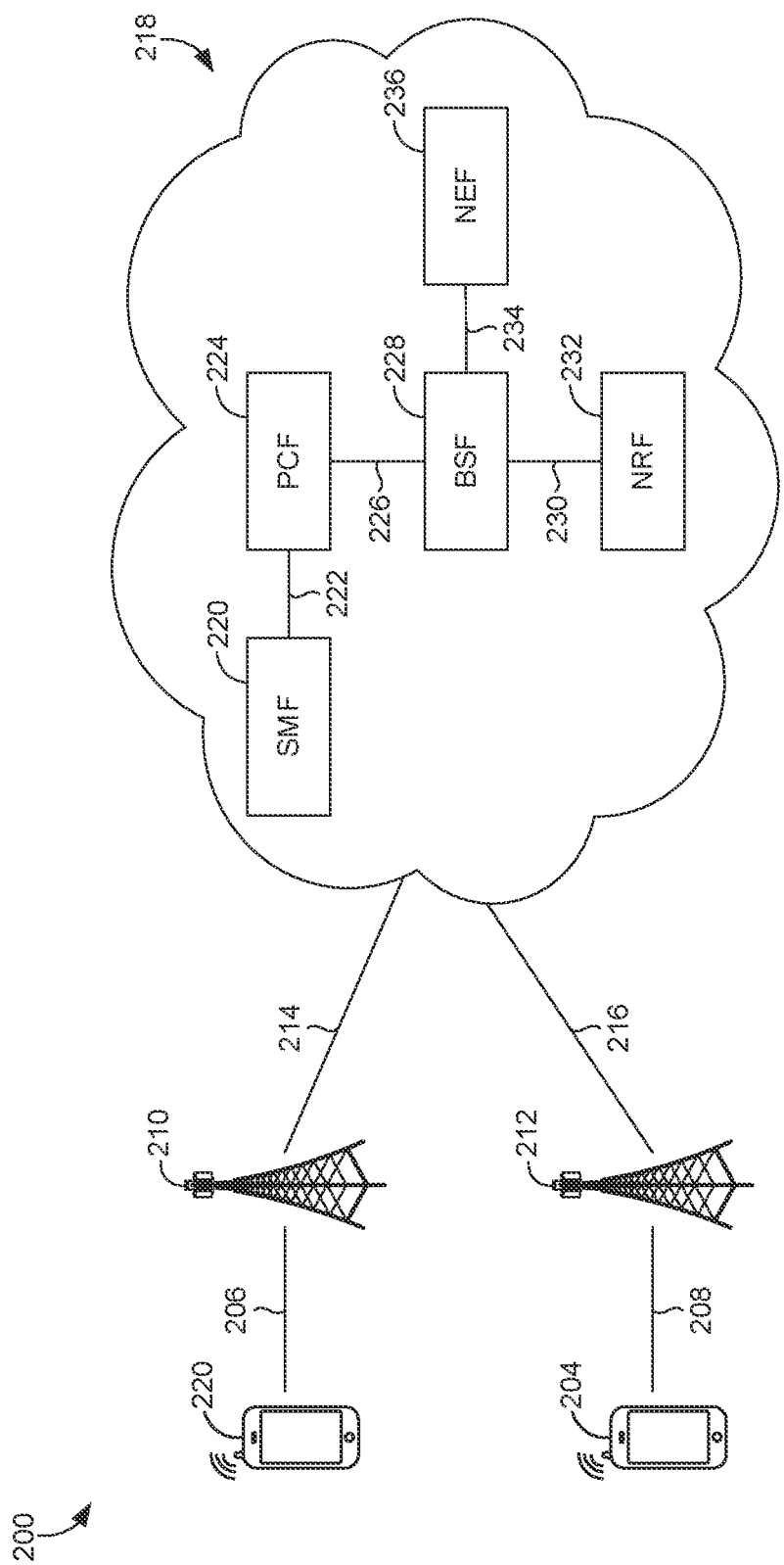
FIG. 2 illustrates a diagram of an exemplary network environment in which implementations of the present disclosure may be employed.

Referring now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as a first UE 202 and/or a second UE 204, one or more base stations, such as a first base station 210 and/or a second base station 212, and a core network 218, though in some implementations, it may not be necessary for certain features to be present. For example, in some aspects, the network environment 200 may not comprise the second base station 212 where the first UE 202 and the second UE 204 connect to the first base station 210. The network environment 200 is generally configured for wirelessly connecting the first UE 202 and/or the second UE 204 to data or services that may be accessible on one or more application servers or other functions, nodes, or servers not pictured in FIG. 2 so as to not obscure the focus on the present disclosure.

The network environment 200 comprises one or more of the first UE 202 and the second UE 204. The first UE 202 and the second UE 204 are illustrated generally, and may take any number of forms, including a tablet, phone, or wearable device, or any other device discussed with respect to FIG. 1 and may have any one or more components or features of the computing device 100 of FIG. 1. In some aspects, the first UE 202 and/or the second UE 204 may not be a conventional telecommunications devices (i.e., a device that is capable of placing and receiving voice calls), but may instead take the form of devices that only utilizes wireless network resources in order to transmit or receive data; such devices may include IoT devices (e.g., smart appliances, thermostats, locks, smart speakers, lighting devices, smart receptacles, and the like).

The network environment 200 comprises one or more of the first base station 210 and/or the second base station 212 to which the first UE 202 and the second UE 204 may potentially connect to (also referred to as 'camping on,' 'attaching,' in the industry). Though network environment 200 is illustrated with both the first base station 210 and the second base station 212, one skilled in the art will appreciate that more or fewer base stations may be present in any particular network environment. Each of the first base station 210 and/or the second base station 212 of the network environment 200 is configured to wirelessly communicate with UEs, such as the first UE 202 and/or the second UE 204. In aspects, any of first base station 210 and/or the second base station 212 may communicate with one or more of the first UE 202 and/or the second UE 204 using any wireless telecommunication protocol desired by a network operator, including but not limited to 3G, 4G, 5G, 6G, 802.11x and the like.

Each base station of the first base station 210 and the second base station 212 is configured to transmit and receive one or more of a first signal 206 and/or a second signal 208 between a base station and the first UE 202 and between a base station and the second UE 204. The one or more of the first signal 206 and the second signal 208 comprise one or more uplink signals for which the first base station 210 and/or the second base station 212 are configured to receive from the first UE 202 and/or second UE 204. The one or more of the first signal 206 and the second signal 208 may also comprise downlink signals for which the first base station 210 and/or the second base station 212 are configured to receive from the first UE 202 and/or the second UE 204. In response to receiving certain requests from the first UE 202 and/or the second UE 204, the first base stations 210 and/or the second base station 212 may communicate with the core network 218 via a first backhaul 214 and a second backhaul 216. For example, in order for the first UE 202 to connect to a desired network service (e.g., PSTN call, voice over LTE (VoLTE) call, voice over new radio (VoNR), data, or the like), the first UE 202 may communicate an attach request to the first base station 210, which may, in response, communicate a registration request to the core network 218 via the first backhaul 214.

Relevant to the present disclosure, one or more components of the core network 218 may work cooperatively to create and manage sessions of one or more of the first UE 202 and/or the second UE 204. As used herein, the terms "network function" and "component" are used to describe a computer processing module and/or one or more computer executable services being executed on one or more computing processing modules. For example, the core network 218 may comprise network function (NF) components that include any one or more of a session management function (SMF) 220, a policy control function (PCF) 224, a binding support function (BSF) 228, a network repository function (NRF) 232, and a network exposure function (NEF) 236. Notably, the preceding nomenclature is used with respect to the 3GPP 5G architecture; in other aspects each of the preceding NF components may take different forms, including consolidated or distributed forms that perform the same general operations. For example, the one or more PCFs 224 in the 3GPP 5G architecture is configured for various functions relating to policy management and enforcement; in other forms, such as a 4G architecture, the one or more PCFs 224 of FIG. 2 may take the form of a policy and charging rules function (PCRF). In other architectures or protocols, the NF components may go by other names, however, the NF components herein refer to functions, not specifically identified components. Though the SMF 220, the PCF 224, the BSF 228, the NRF 232, and the NEF 236 are illustrated in the core network 218, the core network 218 may have more or fewer NF components than shown. For example, the core network 218 may include an application function (AF) component.

The network environment 200 may comprise an NF component responsible for session management, such as the SMF 220. Though shown as disposed within the core network 218, it is expressly contemplated that the location illustrated in the network environment 200 is non-limiting. For example, the SMF 220 may be disposed between the one or more of the first base station 210 and/or the second base station 212 and the core network 218 (i.e., network edge) or may be isolated as a stand-alone component. The SMF 220 is generally configured to create, manage, and terminate sessions in a network environment 200 according to policies received from the one or more PCFs 224 via n7 interface 222. The network environment 200 is not meant to exhaustively show every interface that would be necessary to practice the invention, so as not to obscure the present disclosure, but is instead meant to illustrate one or more potential interfaces between NF components. In aspects, the SMF 220 may establish a session after authorizing the one or more of the first UE 202 and/or the second UE 204 is allowed to access the network based on user-specific policy information obtained from the one or more PCFs 224. In establishing a session, the SMF 220 may create session information by assigning a session identifier, such as an IPv6 address, and associating the session identifier with a particular session. The SMF 220 may detect or obtain a device identifier, such as a SUPI, that is associated with a particular device, and associate the device identifier with the session identifier. In aspects, during an active session, the SMF 220 may modify or update session parameters based on data received from the one or more PCFs 224 such as user quality of service (QOS) requirements, use restrictions, or other requirements or prohibitions of subscriber agreements. The SMF 220 may communicate when a session has been created and terminated to the one or more PCFs 224. For example, a session is created between UE 202 and the core network 218, and the SMF 220 communicates session information to the one or more PCFs 224 to obtain relevant policy information. Under typical circumstances, when the session is terminated, the SMF 220 communicates to NF components, such as the one or more PCFs 224, that the session has been terminated and that the session identifier is released for reuse. However, in some cases, due to abrupt disconnection or network issues, the termination of a session may not be communicated to NF components, such as the one or more PCFs 224 or BSF 228, resulting in NF components retaining stale session information and causing bad requests.

The network environment 200 may additionally comprise one or more NF components associated with policy enforcement, such as one or more PCFs 224. While a single PCF 224 is shown in FIG. 2, it is expressly contemplated that there may be more than one PCF 224 in the network environment 200. Though shown as disposed within the core network 218, it is expressly contemplated that the location illustrated in the network environment 200 is non-limiting. For example, the one or more PCFs 224 may be disposed between the one or more of the first base station 210 and/or the second base station 212 and the core network 218 (i.e., network edge) or may be isolated as a stand-alone component. The one or more PCFs 224 are generally configured to communicate policy information to NF components, such as the SMF 220, which can be used to enforce policies such as QOS requirements, via first interface 222. The one or more PCFs 224 may relay session information by registering and removing session information with other NF components associated with collecting and storing session information, such as the BSF 228.

Session information may be communicated between NF components, such as from the SMF 220 to the one or more PCFs 224, or from the one or more PCFs 224 to the BSF 228. Session information may include, but is not limited to, a subscriber or device identifier (such as a SUPI), a generic public subscription identifier (GPSI), a session identifier such as an IP address (such as IPv4 or IPv6), a media access control (MAC) address, a data network name (DNN), and any other information relating to session creation, identification, modification, and termination. Session information may also include information regarding the one or more PCFs 224 that relayed the session information like a PCF identifier such as an NF instance identification, a diameter host and diameter realm for the one or more PCFs 224 with a diameter interface, end points associated with the one or more PCFs 224, and any other information relating to policy enforcement and PCF identification. It is expressly contemplated that one or more of the described data that may comprise session information may be absent. Further, the particular session information exchanged between NF components may vary depending on which NF components are communicating. Relevant to the present disclosure, session information may additionally comprise a timestamp defining the time a session was created. In other examples, the timestamp may define a time when a session entry was deposited into a dataset, a time when a session was terminated, or a time when session information was communicated to an NF component. As used herein, the term "time" refers to a calendar date (i.e., days, months, years), and/or numerical time of a particular day (i.e., hours, minutes, seconds), or a combination of these.

The network environment 200 may additionally comprise a BSF 228. Though shown as disposed within the core network 218, it is expressly contemplated that the location illustrated in the network environment 200 is non-limiting. For example, the BSF 228 may be disposed between the one or more of the first base station 210, and/or the second base station 212 and the core network 218 (i.e., network edge) or may be isolated as a stand-alone component. The BSF 228 is generally configured to receive session information from NF components, such as the one or more PCFs 224, via second interface 226, and provide session information to NF components, such as an NRF 232 or an NEF 236, via a third interface 230 and a fourth interface 234. The BSF 228 may format and enter the session information into a dataset of the BSF 228. The BSF 228 may then provide session information entries stored in the dataset to respond to requests from other NF components. For example, other NF components may request and use session information entries to determine which one or more PCFs 224 to query to obtain policy information to fulfill service requests.

An NF component, such as the BSF 228, may interact with a dataset storing session information entries. The dataset may reside within the core network 218, on the network edge, or in a stand-alone location beyond the reaches of the core network 218. The dataset may be a locally-stored dataset (e.g., on the BSF 228 itself), stored on a cloud, or stored using other storage methods known in the art. The dataset is generally configured to store session information entries created by NF components such as the BSF 228. Session information entries include at least some of the data described with reference to FIG. 2, such as a session identifier, a device identifier, and a timestamp. Session information entries from the dataset may be modified by the BSF 228 when the BSF 228 receives a communication from another NF component, such as the one or more PCFs 224, providing updated session information. For example, under typical conditions, the SMF 220 may communicate to the one or more PCFs 224 that a session has ended and the session identifier is released, which in turn, the one or more PCFs 224 may communicate to the BSF 228 when a session has ended and session identifier released, causing the BSF 228 to remove the session information entry corresponding to the session identifier from the dataset. However, in some cases, abrupt disconnection or network issues can prevent the termination message from being sent or received by NF components.

NF components may comprise an interface enabling modification or removal of information from the network environment 200 such as stale session information entries from the dataset. For example, the dataset may be configured with an interface that allows an NF component, such as the BSF 228, to directly interface with the dataset in order to manage, audit, modify and/or remove session information entries of the dataset. The interface may take the form of a communicative connection between the dataset and the NF component, such as to permit the NF component to add, modify, remove, or audit the session information entries of the dataset. For example, the BSF 228 may employ the interface to remove a session information entry in response to a communication from the one or more PCFs 224 notifying the termination of a particular session and the release of a session identifier.

NF components with an interface, such as the BSF 228, may fail to receive session termination information from other NF components, such as the one or more PCFs 224. For example, the SMF 220 communicates to the one or more PCFs 224 that a particular session has ended and a session identifier is being released for reuse, however, the one or more PCFs 224, due to network issues or ungraceful disconnection of the first UE 204 and/or the second UE 206, fails to communicate the session termination information to the BSF 228. In some examples, the SMF 220 fails to send the session termination information, and in other examples, the BSF 228 fails to receive the session termination information. NF components with an interface, such as the BSF 228, are unaware of the session termination information and may not remove the associated session information entry from the dataset.

The network environment 200 may additionally comprise NRF 232. Though shown as disposed within the core network 218, it is expressly contemplated that the location illustrated in the network environment 200 is non-limiting. For example, the NRF 232 may be disposed between the one or more of the first base station 210 and/or the second base station 212 and the core network 218 (i.e., network edge) or may be isolated as a stand-alone component. The NRF 232 is generally configured to provide a central repository for information about other NF components in the core network 218 or network environment 200 regarding available services, resource utilization, authorization, etc. NF components register their services with the NEF 232, and the NEF 232 allows other NF components to discover these services. For example, the NRF 232 may communicate with NF components, such as the BSF 228, regarding the status and available services of other NF components via fourth interface 234.

The network environment 200 may additionally comprise NEF 236. Though shown as disposed within the core network 218, it is expressly contemplated that the location illustrated in the network environment 200 is non-limiting. For example, the NEF 236 may be disposed between the one or more of the first base station 210 and/or the second base station 212 and the core network 218 (i.e., network edge) or may be isolated as a stand-alone component. The NEF 236 is generally configured to make capabilities or information of NF components, such as the BSF 228, available to third party entities or other NF components, such as AFs. For example, the NEF 236 may request information associated with a session identifier within a session information entry of the dataset of the BSF 228 to assist third party entities in authenticating or fulfilling a service request. For example, the NEF 236 may receive a request for QOS uplift, and in response, requests session information associated with a session identifier from the BSF 228 to determine the one or more PCFs 224 to query to determine the level of quality required by service agreements. In other examples, the NEF 236 may receive a request for authentication by a third party entity, and in response, requests session information associated with a session identifier from the BSF 228 to determine which of the one or more PCFs 224 to query to determine whether a session or device is authorized to employ or receive the third party services.

As described more generally above, NF components, such as the BSF 228, may retain stale session information and are unable to fulfill requests from NF consumers, such as the NEF 236 or the NRF 232, as a result of abrupt disconnection of one or more of the first UE 202 and/or the second UE 204, network connectivity issues, or an intentional design choice. Relevant to the present disclosure, NF components, such as the SMF 220 or the one or more PCFs 224, may communicate first session information associated with a first session including a first timestamp and first session identifier to other NF components, such as the BSF 228, for storage in a dataset. When the first session is terminated, network issues or abrupt disconnection prevent NF components from receiving updated first session information indicating the first session identifier has been released for reuse in a subsequent session. Upon the creation and entry of a second session information entry with the same first session identifier as the first session and a second timestamp, the BSF 228 may determine the first session information entry is stale. For example, the BSF 228 may determine staleness in response to identifying two entries in the dataset are both associated with the first session identifier, and then determining the second timestamp is more recent than the first timestamp. In other examples, the BSF 228 may determine staleness in response to determining a threshold amount of time has passed since creation of the first timestamp. In other examples, the BSF 228 may determine staleness in response to determining the dataset exceeds a pre-defined threshold number of entries. Once the NF component, such as the BSF 228, determines staleness of the first session information entry, the NF component may employ an interface to remove the first session information entry in favor of the second session information entry. In some examples, the BSF 228 determines staleness in response to a request from an NF consumer, and in other examples, the BSF 228 determines staleness before a request from an NF consumer occurs.

Figure 3:
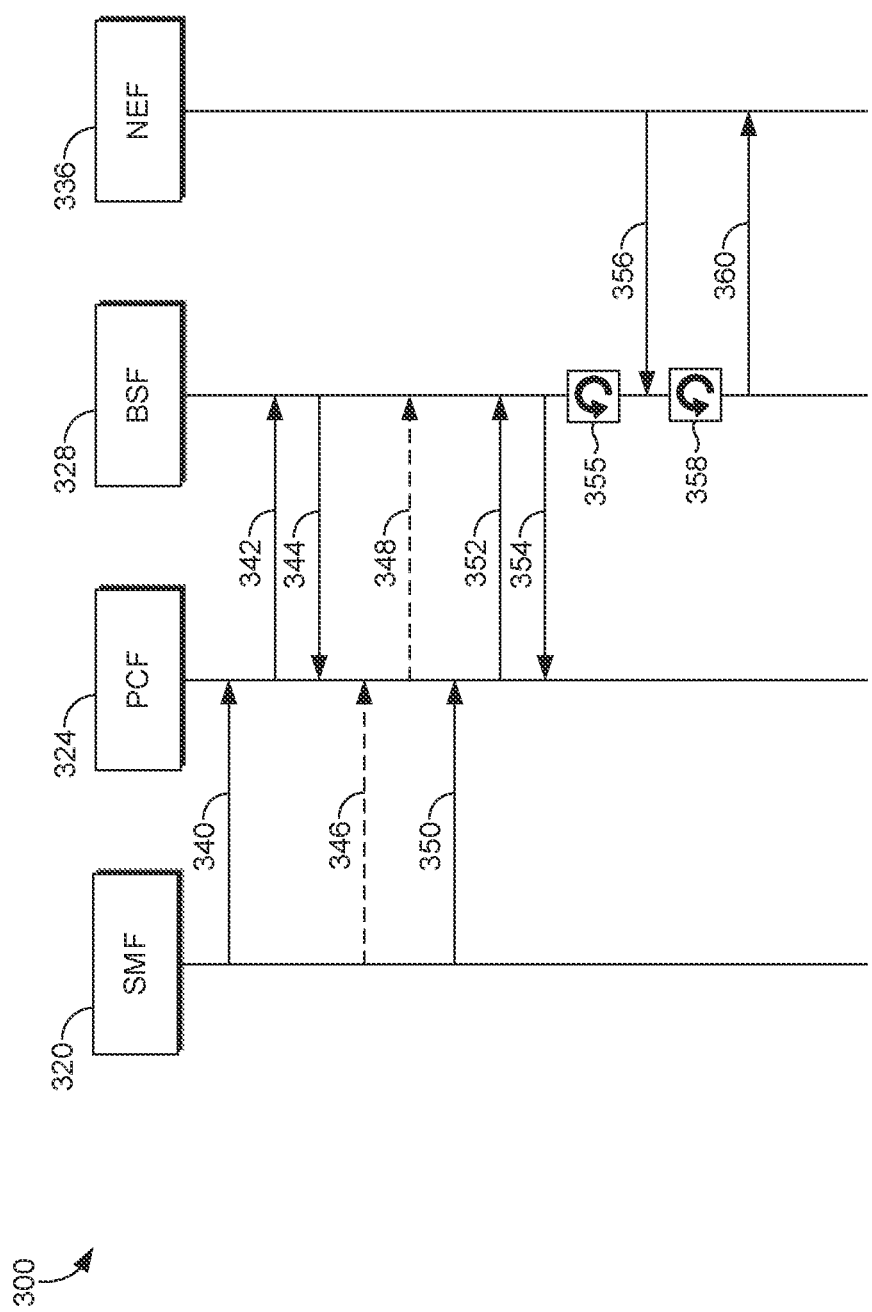
FIG. 3 illustrates a flow diagram of an exemplary method for eliminating conflicting session information in which implementations of the present disclosure may be employed.

Turning now to FIG. 3, a call flow diagram is illustrated in accordance with one or more aspects of the present disclosure. A call flow 300 may be said to exist between one or more components discussed in greater detail herein and is not meant to exhaustively show every interaction that would be necessary to practice the invention, so as not to obscure the present disclosure, but is instead meant to illustrate one or more potential interactions between components. The call flow 300 may be relevantly said to include an SMF 320 (such as the SMF 220 of FIG. 2), a PCF 324 (such as the one or more PCFs 224 of FIG. 2), a BSF 328 (such as the BSF 228 in FIG. 2), and an NEF 336 (such as the NEF 236 of FIG. 2). In some aspects, the NEF 336 may be any NF consumer requesting information from the BSF 328, such as the NRF 232 in FIG. 2. Notably, the preceding nomenclature is used with respect to the 3GPP 5G architecture; in other aspects each of the preceding NF components may take different forms, including consolidated or distributed forms that perform the same general operations. For example, the one or more PCFs 324 in the 3GPP 5G architecture is configured for various functions relating to policy management and enforcement; in other forms, such as a 4G architecture, the one or more PCFs 324 of FIG. 3 may take the form of a PCRF.

At a first step 340, the SMF 320 may communicate first session information to the one or more PCFs 324. First session information may include any of the session information data described with respect to FIG. 2, including a first session identifier, such as an IPv6 address, a first device identifier, such as a SUPI, and a first timestamp, such as when the first session was created. At a second step 342, the one or more PCFs 324 may communicate the first session information including the first timestamp to the BSF 328. The BSF 328 may then memorialize the first session information by creating a first session information entry in a dataset. At a third step 344, the BSF 328 may confirm receipt of the session information by responding to the one or more PCFs 324 with a confirmation message such as "200 OK." In some aspects, the confirmation message may comprise other indications of confirmation, as appreciated by one skilled in the art. At some subsequent time, the first session is then terminated, and the first session identifier is released by the SMF 320 for reuse for a subsequent session. At a fourth step 346, under typical conditions, the SMF 320 should communicate a termination message that notifies the one or more PCFs 324 that the first session identifier has been released for reuse in a subsequent session. At a fifth step 348, under typical conditions the one or more PCFs 324 should communicate the termination message to the BSF 328. Once the BSF 328 receives the termination message, the BSF 328 may remove the associated session information entry from its dataset to prevent later conflicts with the same session identifier. However, the termination message may not be received by the BSF 328 due to a failure or fault, or due to an abrupt disconnection of a UE, such as the first UE 204 and/or the second UE 204 as described in one or more embodiments of FIG. 2, or due to an intentional design choice. Regardless, the fourth step 246 and the fifth step 348 do not occur. As a result, the BSF 328 may retain the stale session information entry associated with the first session in its dataset when the termination message is not received from the one or more PCFs 324.

At a sixth step 350, the SMF 320 may communicate second session information to the one or more PCFs 324. Second session information may include any of the data described with respect to FIG. 2, including the same first session identifier from the first session information, such as the same IPv6 address as in the first session, a second device identifier, and a second timestamp. At a seventh step 352, the one or more PCFs 324 may communicate the second session information, including the first session identifier and second timestamp, to the BSF 328. The BSF 328 may then memorialize the second session information by creating a second session information entry in the dataset. At a eighth step 354, the BSF 328 may confirm receipt of the session information by responding to the one or more PCFs 324 with a confirmation message such as "200 OK."

In some embodiments, at an optional ninth step 355, the BSF 328 is triggered to employ logic to determine the second session information entry is stale as compared to the first session information entry. The BSF 328 may make this determination in a number of ways. For example, the BSF 328 may make this determination in response to the first session information entry and the second information entry both being associated with the first session identifier and in response to determining the second timestamp is more recent than the first timestamp. In some examples, the BSF 328 determines the second timestamp is more recent than the first timestamp at pre-defined intervals of time. In some examples, the BSF 328 may make this determination in response to creating the second session information entry or in response to receiving the second session information from the one or more PCFs 324. In other examples, the NF component may determine staleness in response to determining a threshold amount of time has passed since the creation of the first timestamp. For example, the NF component may determine staleness of the first session information entry once a set number of days has passed since the session was created, since the first session information entry entered into the dataset, or since the session information was communicated to an NF component. In other examples, the NF component may determine staleness of the first session information entry in response to determining a number of records stored in the dataset exceeds a pre-defined threshold. For example, the NF component may find the first session information entry is stale in response to finding the number of stored records exceeds 50,000 entries. In some examples, the BSF 328 makes this determination in response to a combination of the above triggers occurring.

At an alternative ninth step 356 (i.e., an alternative to ninth step 355), the NEF 336 may communicate a request for session information associated with the first session identifier. The BSF 328 may have two separate entries in the dataset associated with the first session identifier, and must determine which entry the NEF 336 is requesting information about. The first session information entry may be associated with the first timestamp, and the second session entry may be associated with the second timestamp. At an alternative tenth step 358, the BSF 328 employs logic to determine the second timestamp is more recent than the first timestamp. At an alternative eleventh step 360, the BSF 328 may then communicate the second session information associated with the second timestamp to the NEF 336 based on the determination that the second timestamp is more recent than the first time step. In other examples, the BSF 328 communicates the second session information to any NF consumer requesting information from the BSF 328.

Figure 4:
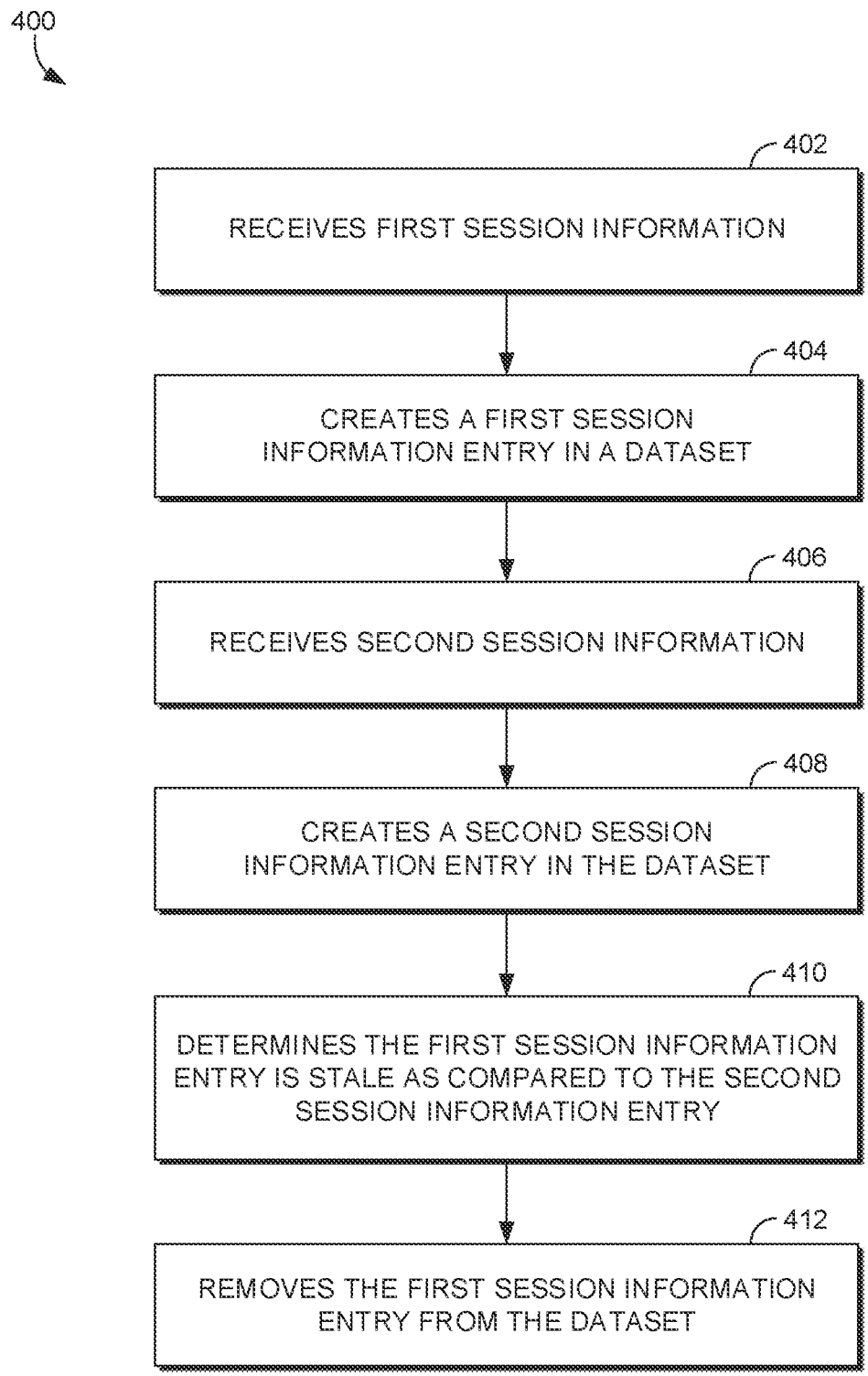
FIG. 4 illustrates a flow diagram of an exemplary method for eliminating stale session information in which implementations of the present disclosure may be employed.

Turning now to FIG. 4, a flow chart is provided that illustrates one or more aspects of the present disclosure relating to a method 400 for proactively removing conflicting session information entries from a dataset. At a first step 402, an NF component, such as the BSF 220, 320 of FIGS. 2 and 3, receives first session information from another NF component, such as the one or more PCFs 224, 324 of FIGS. 2 and 3. First session information may include a first device identifier, a first session identifier, and a first timestamp, as well as any session information discussed with respect to FIG. 2. At a second step 404, the NF component creates a first session information entry in a dataset, including at least some of the first session information. At a third step 406, the NF component receives second session information from the other NF component. Second session information may include a second device identifier, the first session identifier (such as the same IPv6 address assigned in the first session), and a second timestamp. At a fourth step 408, the NF component creates a second session information entry in the dataset, including at least some of the second session information.

At a fifth step 410, the NF component determines the first session information entry is stale as compared to the second session information entry. The NF component may make this determination in a number of ways. For example, the NF component may make this determination in response to the first session information entry and the second information entry both being associated with the first session identifier and in response to determining the second timestamp is more recent than the first timestamp. In some examples, the NF component makes this determination in response to creating the second session information entry or in response to receiving the second session information. In other examples, the NF component may determine staleness in response to determining a threshold amount of time has passed since the creation of the first timestamp. For example, the NF component may determine staleness of the first session information entry once a set number of days has passed since the session was created, since the first session information entry entered into the dataset, or since the session information was communicated to an NF component. In other examples, the NF component may determine staleness of the first session information entry in response to determining a number of records stored in the dataset exceeds a pre-defined threshold. For example, the NF component may find the first session information entry is stale in response to finding the number of stored records exceeds 50,000 entries. In some examples, the NF component makes this determination using a combination of the above triggers. At a sixth step 412, the NF component removes the first session information entry from the dataset in favor of the second session information entry.

Figure 5:
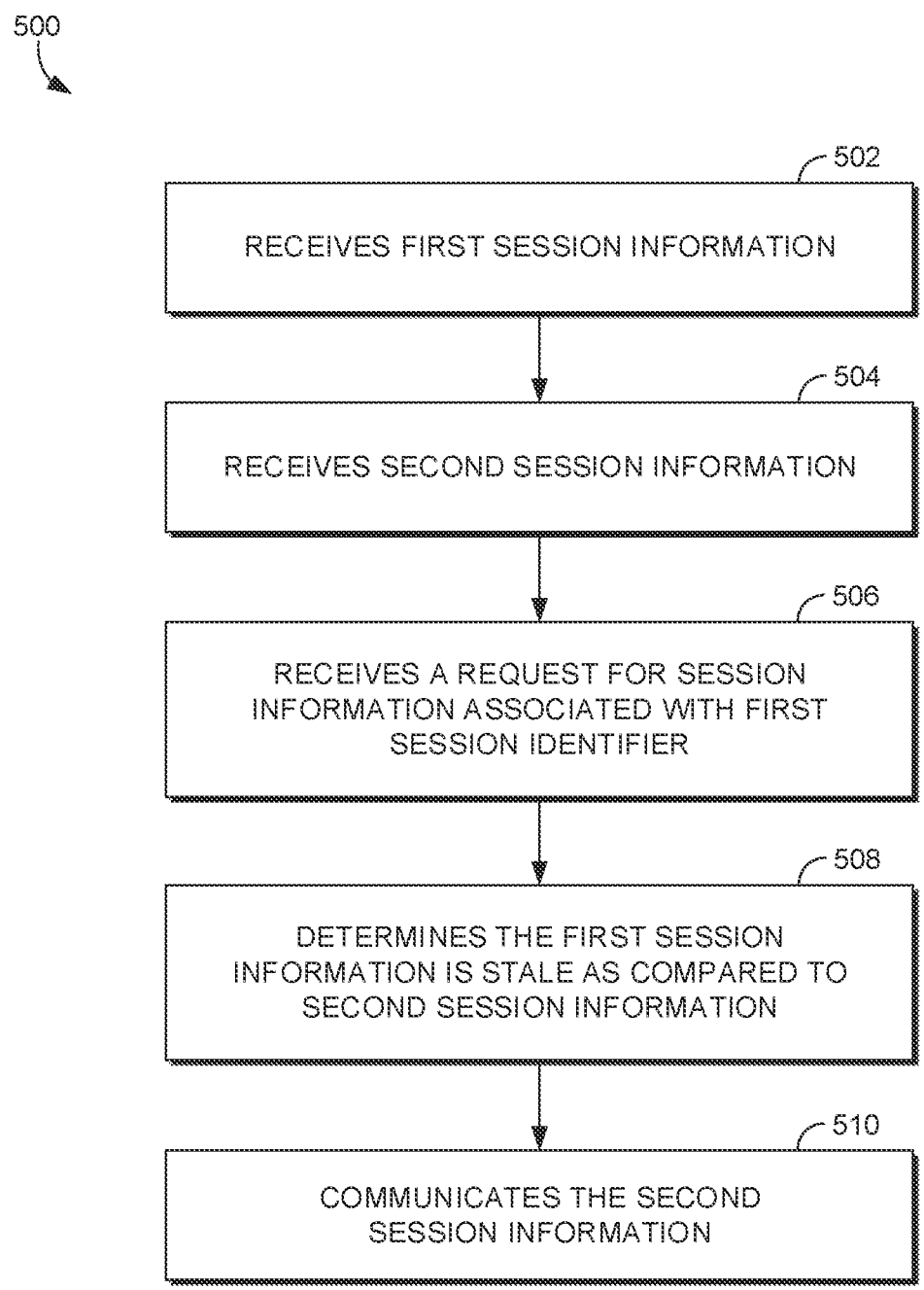
FIG. 5 illustrates a flow diagram of an exemplary method for eliminating stale session information in which implementations of the present disclosure may be employed.

Turning now to FIG. 5, a flow chart is provided that illustrates one or more aspects of the present disclosure relating to a method 500 for reactively resolving session information conflicts. At a first step 502, an NF component, such as the BSF 220, 320 of FIGS. 2 and 3, receives first session information from another NF component, such as the one or more PCFs 224, 324 of FIGS. 2 and 3. First session information may include a first device identifier, a first session identifier, and a first timestamp. At a second step 504, the NF component receives second session information from the other NF component. The second session information may comprise the first session identifier, a second device identifier, and a second timestamp. At a third step 506, the NF component receives a request from an NF consumer, such as the NEF 232, 332 of FIGS. 2 and 3, for session information associated with the first session identifier. Per the first step 502 and second step 504, both the first session information and the second session information are associated with the first session identifier, and without a way to determine which session information the NF consumer is requesting information for, the NF component would be unable to fulfill the request due to conflicting session information.

To resolve the conflict, at a fourth step 508, the NF component determines the first session information is stale compared to second session information. The NF component may determine staleness by determining that both the first session information and the second session information are associated with the first session identifier, and then determining the second timestamp is more recent than the first timestamp. At a fifth step 510 and upon determining the first session information is stale as compared to the second session information, the NF component communicates the second session information to fulfill the request for session information associated with the first session identifier.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for managing session information in a core network, the method comprising:
   receiving, at a first network function (NF) component, first session information associated with a first session between a first user equipment (UE) and the core network from a second NF component, the first session information comprising a first timestamp, a first device identifier associated with the first UE, and a first session identifier;
   creating, by the first NF component, a first entry in a locally stored dataset, the first entry comprising the first session information, wherein after the creating, the first session terminates, and termination of the first session is not communicated to the second NF component;
   receiving, at the first NF component, second session information associated with a second session between a second UE and the core network from the second NF component, the second session information comprising a second timestamp, a second device identifier associated with the second UE, and the first session identifier, wherein the second UE is different from the first UE;
   creating, by the first NF component, a second entry in the locally stored dataset, the second entry comprising the second session information;
   determining the first entry is stale as compared to the second entry; and
   removing, based on the determination, the first entry from the locally stored dataset.

2. The method of claim 1, wherein the first NF component is a binding support function (BSF) and the second NF component is a policy control function (PCF).

3. The method of claim 2, further comprising communicating the second session information in response to a request from an NF consumer.

4. The method of claim 3, wherein the NF consumer is a network exposure function (NEF).

5. The method of claim 4, wherein determining the first entry is stale as compared to the second entry comprises determining the first entry and the second entry are both associated with the first session identifier and that the second timestamp is more recent than the first timestamp.

6. The method of claim 5, wherein determining the second timestamp is more recent than the first timestamp is in response to creating the second entry.

7. The method of claim 4, wherein the first NF component determines the first session identifier is associated with both the first entry and the second entry at intervals of a predetermined length of time.

8. The method of claim 4, wherein determining the first entry is stale as compared to the second entry is in response to determining a threshold amount of time has passed since creation of the first timestamp.

9. The method of claim 4, wherein the first session identifier is an Internet Protocol version 6 (IPv6) address.

10. A method for managing session information in a core network, the method comprising:
    receiving, at a first network function (NF) component, first session information associated with a first session between a first user equipment (UE) and the core network, the first session information comprising a first session identifier, a first device identifier associated with the first UE, and a first timestamp, wherein the first session terminates subsequent to the receiving;
    receiving, at the first NF component, second session information associated with a second session between a second UE and the core network, the second session information comprises the first session identifier, a second device identifier associated with the second UE, and a second timestamp, wherein the second UE is different from the first UE;
    receiving, at the first NF component, a request for session information associated with the first session identifier;
    in response to the request for session information, determining the first session information is stale as compared to the second session information; and
    communicating, based on the determination, the second session information in response to the request for session information.

11. The method of claim 10, wherein the first NF component is a binding support function (BSF).

12. The method of claim 11, wherein determining the first session information is stale as compared to the second session information comprises determining the first session information and the second session information are both associated with the first session identifier and that the second timestamp is more recent than the first timestamp.

13. The method of claim 12, wherein determining the second timestamp is more recent than the first timestamp is in response to the request for session information.

14. The method of claim 11, further comprising removing, based on the determination, the first session information from a locally stored dataset.

15. A system for managing session information in a core network, the system comprising:
- a network function (NF) consumer comprising one or more processors configured to perform operations comprising:
- communicating a request for session information associated with a first session identifier to an NF producer, wherein the first session identifier is associated with a first session and a second session, wherein the first session is between a first user equipment (UE) and the core network, and wherein the second session between a second UE and the core network, wherein the first UE and the second UE are different; and
- the NF producer comprising one or more processors configured to perform operations comprising:
- receiving first session information from a policy control function (PCF) for the first session, the first session information comprising a first timestamp, a first device identifier associated with the first UE, and the first session identifier;
- receiving second session information from the PCF for the second session, the second session information comprising a second timestamp, a second device identifier associated with the second UE, and the first session identifier, wherein the first session identifier has been reused for the second session;
- in response to the request, determining the second timestamp is more recent than the first timestamp; and
- communicating, based on the determination, the second session information to the NF consumer.

16. The system of claim 15, wherein the NF producer is a binding support function (BSF).

17. The system of claim 16, wherein the NF consumer is a network exposure function (NEF).

18. The system of claim 17, wherein the request for session information comprises a request to uplift a quality of service.

19. The system of claim 17, wherein the request for session information comprises a request to authenticate a session.

20. The system of claim 15, wherein the first session identifier is an Internet Protocol version 6 (IPv6) address.

* * * * *